Feb. 17, 1942.        W. MESSINGER        2,273,129
BEARING SEAL
Filed June 7, 1939

WITNESS:

INVENTOR
William Messinger
BY
Augustus B. Stoughton
ATTORNEY.

Patented Feb. 17, 1942

2,273,129

UNITED STATES PATENT OFFICE 2,273,129

BEARING SEAL

William Messinger, Philadelphia, Pa.

Application June 7, 1939, Serial No. 277,883

1 Claim. (Cl. 286—9)

This invention relates to sealing means for preventing the loss of lubricant from the housing of rolling mill roll neck bearings, and for preventing water or other injurious substances from entering the bearing compartment.

A general requirement of seals or stuffing boxes for this purpose is that their diameter must be large in relation to their width and radial thickness, particularly at the end of a roll neck bearing housing which is adjacent to the end face of the roll barrel. There the necessary bending strength determines the minimum permissible diameter of the roll while the outside dimensions of the bearing housing are limited by the proximity of the mill housing for the coacting roll. The width of the sealing device is also restricted because to minimize bending of the roll neck, it is necessary to make the distances between the roll barrel and the adjacent end of the bearing as small as possible.

A stuffing box for this purpose must be capable of conforming to eccentric displacement of the roll neck with respect to the bearing housing since considerable clearance exists in the bearing and also between the end walls of the bearing housing and the revolving roll neck. Furthermore, the stuffing box should be conveniently adjustable to a predetermined degree of tightness from a remote position.

One object of the present invention is to provide an effective and dependable sealing device between the end walls of the bearing housing and the roll neck which shall be sufficiently compact to be installed in the limited available space and which shall pack the clearance provided between the end of the bearing housing and the revolving roll neck while at the same time accommodating itself to distortion, radial looseness or eccentricity of movement of the roll neck, and while at the same time sealing the clearance space against the exit of oil from the bearing compartment of the housing and the entrance of water or other fluid used in the rolling operation.

The invention also comprises the improvements to be presently described and finally claimed.

Figure 1:
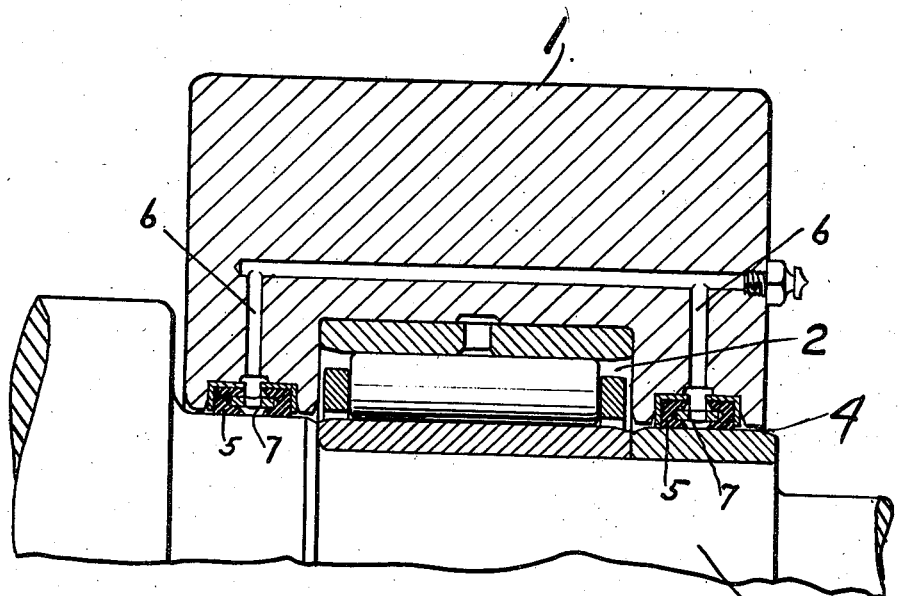
Figure 2:
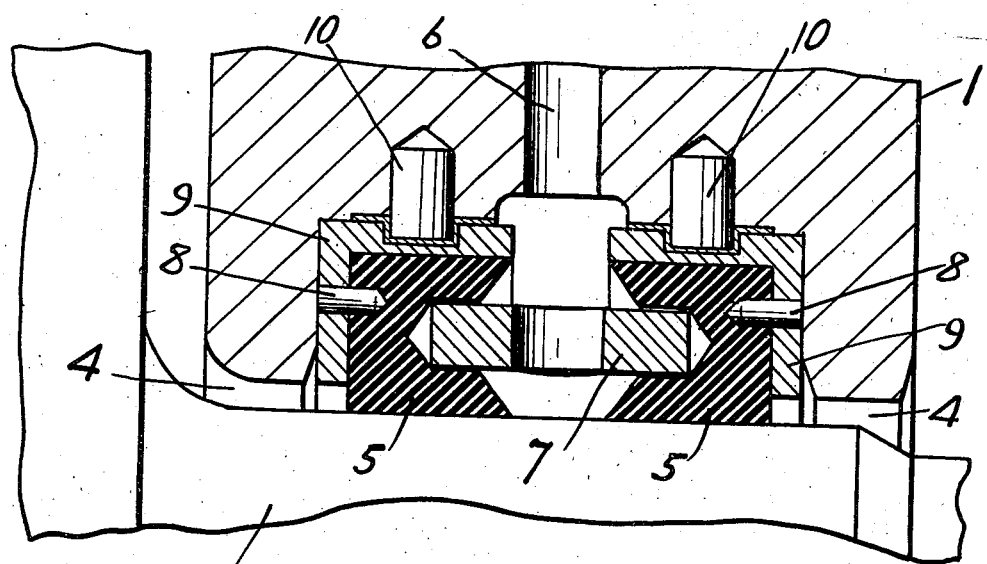

In the following description reference will be made to the accompanying drawing forming part hereof and in which:

Figure 1 is a fragmentary view partly in section and partly in elevation of portions of a rolling mill roll neck bearing equipped with sealing means embodying features of the invention; and Figure 2 is a similar view of part of the structure shown in Figure 1 drawn to an enlarged scale.

Referring to the drawing, 1 indicates the housing of the bearing and 2 indicates the bearing compartment and 3 indicates the roll neck. Between the ends of the housing and the revolving surface of the roll neck clearance is provided at 4 in order to provide for eccentric movements of the roll neck 3, such as are due to compression and radial looseness of the bearing elements. The top roll of a mill stand is suspended by its bearing housings. When the bar or strip which has to be rolled enters the mill, it produces separation of the rolls, the top roll jumps vertically upward a distance equal to the radial clearance in the bearings. When the bar leaves the mill, the top roll drops down again. 5 indicates a resilient packing ring, as of rubber or like material which projects from the housing and spans the clearance space 4 and hugs the surface of the revolving roll neck 3; thus sealing the bearing compartment 2 against escape of oil and the entrance of water. The packing rings 5 are mounted in pairs with space between them and passages 6 serve for the introduction of grease or the like under pressure between them, and this grease under pressure serves to project the rings with any desired force in all directions and toward the axis of the roll neck 3. The rings 5 are shown as U-shape in cross-section and they are mounted in an annular groove provided in the housing 1 in such a way that they abut upon the side walls and circumferential wall of the groove and in this way when compressed under grease pressure they not only span the clearance space but also hug the roll neck 3. 7 indicates a perforated ring mounted between the packings 5. Pins 8 serve to oppose rotation of the rings of packing. As shown in the drawing, the groove is provided by rings 9 of angle shape held in the housing by dowel pins 10.

In the operation of a rolling mill the roll necks or journals 3 are constantly subjected to radial displacement with respect to the journal housing 1. The radial clearance 4 permits this movement. The two packing rings 5 in the annular groove are of resilient material and are flexible and they retain their grasp on the roll neck notwithstanding the radial displacement of the latter. In this way the bearing compartment 2 is sealed against the escape of lubricant and the entrance of water used in the rolling operation.

I claim:

In combination a bearing housing having substantial clearance at its ends in respect to the rotating element which is applied to it and which is subject to eccentric movement that takes place in the clearance, separate complete rings of packing material spanning and packing the clearance space at the ends of the housing and mounted in the housing, and means for applying fluid pressure between the rings, the rings being composed of resilient material which is free to follow and accommodate the eccentric movements of the rotating element while closely hugging it.

WILLIAM MESSINGER.